United States Patent Office 2,982,626
Patented May 2, 1961

2,982,626

PROCESS FOR ETCHING A GLASS-CONTAINING SURFACE

Ilmars L. Kalnins, Plainfield, N.J., assignor to Bell Telephone Laboratories, Incorporated, New York, N.Y., a corporation of New York No Drawing. Filed Sept. 22, 1959, Ser. No. 841,441

8 Claims. (Cl. 41—42)

This invention relates to a process for etching surfaces containing a layer of glass.

Copending applications Serial No. 730,832 filed April 28, 1958, now abandoned and No. 817,747 filed June 3, 1959, both by S. S. Flaschen and A. D. Pearson, describe low-melting encapsulating media for circuit elements. Such media include single phase glass compositions of the arsenic-sulfur, arsenic-thallium-sulfur and arsenic-iodine-sulfur systems. As further described in the copending applications compositional variations include the partial or total substitution of selenium for sulfur; the partial substitution of antimony and bismuth for arsenic; and of tin, indium, and lead for thallium as well as the addition of small amounts of material for modifying physical properties as, for example, to decrease plastic flow.

The glasses mentioned have shown particular usefulness as an encapsulating medium for electrical circuit components as, for example, resistors, capacitors, rectifiers, transistors, tetrodes, and so forth. In certain embodiments the molten glass is applied to the surfaces of the circuit element to be covered, and allowed to cool and solidify. Because the glass fuses at relatively low temperatures, there is little danger of distorting the electrical characteristics of the devices coated due to exposure to unduly high temperatures. Other mechanical and electrical properties dictate the use of the glasses in the packaging of devices. Important among these in the ability of these materials to immobilize ionic impurities and so decrease leakage currents.

Despite the value of the low-melting glasses occasion does arise for their removal, for example from apparatus used in their preparation and even, on occasion, from devices themselves. When the apparatus is heat resistant the glassy material may be melted off. Removal from semiconductive devices, for example, in recovery of these elements is a more serious problem. The glasses have been found to be resistant to the etching action of acids, weak and concentrated, are not readily affected by alkalis or alkaline sulfide solutions, and do not oxidize appreciably rapidly even when treated with alkaline peroxide solutions or hot concentrated nitric acid. Heating in oxygen at 300° centigrade is ineffective in removing most compositions finding use as encapsulants. The problem of cleaning laboratory equipment and the removal or selective etching of glass coatings on coated objects is an acute one in view of the resistance of the new glasses to even the strongest of the common etchants.

The present invention, comprising a two phase etchant solution containing bromine has been found to etch the glasses described at a rapid rate. Also, the solution does not readily attack silicon or germanium, the two materials commonly used in semiconductor circuit elements such as transistors. This latter property of the etchant permits its use in recovering silicon or germanium diodes, transistors, and similar devices by removal of glass coatings thereon without significant change in the electrical properties of the substrate semiconducting material.

In its simplest embodiment, the etchants of the invention comprise a two phase solution of bromine and bromine dissolved in water, prepared by adding water to a vessel containing bromine. The heavier bromine phase remains as a lower layer; the aqueous phase, containing dissolved bromine, forms a lighter layer on the surface. This will be recognized as a common form of preparing and storing the laboratory reagent "bromine water," also known as an oxidizing agent. In laboratory use of "bromine water," the aqueous phase is usually decanted, and can be replenished merely by adding more water and equilibrating its bromine content with the bromine phase. Similarly, bromine alone has known oxidizing properties.

It has been found in the investigation of the present etchant that neither the aqueous phase saturated with bromine, nor the bromine phase, taken alone, are very effective in accomplishing rapid removal of the arsenic glasses. Though some oxidation occurs in either phase taken alone, it is not at a rate sufficiently high to make commercial processes for removing the glasses feasible. The present invention requires the presence of both phases, since oxidation of the glasses is found to occur sufficiently rapidly only in the region immediately adjacent to the interface between the two phases. For best results, in fact, the solution is used by moving the glass coatings to be dissolved back and forth through the interface dividing the phases. Where vessels containing hardened glass are to be cleaned, the two phase solution is swirled or shaken in the vessel to insure that the interface contacts the glass to be dissolved.

The presence of both the aqueous phase and the bromine phase, forming an interface therebetween, is considered critical to the invention. The process of removing glasses of the type described critically requires exposure of the glasses to the interface between the two phases present.

Reaction at the interface may be so rapid that a milder reagent may be preferred. The rapidity of the etching action can then be controlled by diluting the bromine phase with a non-aqueous solvent for bromine. This non-aqueous solvent may be either miscible, slightly miscible, or immiscible with the aqueous phase, though solvents for bromine which are but slightly miscible or immiscible with water are preferred. As such preferred solvents for bromine there can be suggested, among others known to the art, carbon tetrachloride, carbon disulfide, mixtures of these two solvents, bromoform, trichlorethylene, the tetrachloroethanes, pentachloroethane ethyl ether, ethylene bromide, and hexachloropropene. Methyl and ethyl alcohols and acetone are exemplary of the known water miscible solvents for bromine. These reagents are presented as examples of those solvents for bromine known to the art, and are not to be considered as an exhaustive listing.

Of the numerous bromine solvents which can be used to dilute the bromine phase, carbon disulfide has proved to be particularly satisfactory. The oxidizing action of the etchant solution oxidizes the metallic components of the glasses to soluble ionic species and converts sulfide to elemental sulfur. When carbon disulfide is present, it acts to dissolve the sulfur released by attack of the glasses, keeping the solution free of solid particles of sulfur. The dissolved metallic components of the glass are believed to be extracted predominantly into the aqueous phase. Undoubtedly, as to all components of the dissolved glassy materials, there is an equilibrium distribution of the components between the two phases present.

For dilution of the bromine phase, any amount of solvent for bromine may be added. Most rapid etching occurs with a pure bromine phase. Any slower rate thought desirable by those working with the solutions can be achieved by dilution as desired. Neither the relative amounts of bromine and solvent present in the non-aqueous phase, nor the relative amounts of non-aqueous phase to aqueous phase, is critical, providing sufficient quantity of both phases is present to give a two phase system. Considerable latitude in the compositions of the solutions is thus open to the worker using the solutions to adapt them to whatever specific purposes he may desire.

The etching rate increases with increase in the temperature of the solutions. For convenience, the solutions are generally used at room temperature, though they may be heated or cooled if it is thought desirable to do so. At room temperature an etching solution of 25 percent bromine, by volume, and 75 percent water, by volume, has an etching rate of about 0.1 gram of glass per minute for a glass surface area of about one square centimeter.

The efficacy of the two phase solutions in etching the arsenic-sulfur and related glasses is believed due to the formation of hypobromite ion at the interface of the phases, according to:

$$Br_2 + H_2O \rightarrow 2H^+ + Br^- + BrO^-$$

Since concentrated solutions containing hypobromite ion are unstable, it is a surprising result that the relatively weak hypobromite solutions produced by hydrolysis at the interface are more effective in dissolving the glasses mentioned than are such strong oxidizing agents as hot concentrated nitric acid and alkaline peroxide solution. Further, it is a surprising result that the low-melting glasses are easily attacked by the hypobromite ion, although the glasses are resistant to oxidation by hypochlorite ion. The hypochlorite ion is indisputably a stronger oxidizing agent than is the hypobromite ion. The reaction of hypobromite ion with the glasses described appears to be a specific one.

As mentioned earlier, the etchant solutions described are particularly useful in removing glass coatings from silicon or germanium devices encapsulated with the glasses. The following example indicates the compositions of several particularly useful mixtures of the two phase etchant and tabulates the comparative characteristics of devices coated with a variety of glasses before and after treatment with the two phase etchant.

EXAMPLE

Six examplary two phase etchant solutions were made up to have the following compositions:

Table 1

[Percent by volume]

| $Br_2$ | $H_2O$ | $CS_2$ |
|---|---|---|
| 25 | 75 | ---- |
| 40 | 20 | 40 |
| 33⅓ | 33⅓ | 33⅓ |
| 10 | 45 | 45 |
| 50 | 50 | ---- |
| 20 | 60 | 20 |

The effective etching rate of the solutions decreased with the amount of solvent dilution of the bromine phase from a rate of 0.1 gram of glass per minute per square centimeter of glass surface for the first solution listed.

The solutions were used to remove As-Tl-S glasses from reject silicon diodes units having glass coatings of the compositions given in Table 2.

Table 2

[Percent by weight]

| As | Tl | I | S |
|---|---|---|---|
| 50 | 15 | ---- | 35 |
| 32 | 30 | ---- | 38 |
| 30 | 30 | ---- | 40 |
| 35 | 20 | ---- | 45 |
| 35 | 5 | ---- | 60 |
| 23 | 0 | ---- | 77 |
| 15 | 0 | ---- | 85 |
| 29 | ---- | 18 | 53 |
| 24 | ---- | 9 | 67 |

The etching rate of any one of the six etchant solutions did not differ appreciably when used to dissolve the different glass compositions tabulated.

In Table 3 are listed the reverse currents in milliamperes, measured at 200 volts ($I_R^{200}$), or 40 volts ($I_R^{40}$) respectively for high and low breakdown, of a number of diffused junction silicon diodes which developed bad characteristics during packaging made before and after encapsulation in glasses from among the compositions given above in Table 2. Each diode was treated with a solution chosen from those indicated in Table 1 until the glass coating on the diode dissolved (in most cases this removal required about one minute, with the device being moved across the interface of the two solution phases). After removal of the glasses, the silicon semiconductor elements of the devices were given a surface treatment acid re-etch, standard in the semiconductor art.

Table 3

[Milliamperes]

| Reverse Current | Before Encapsulation | After Encapsulation | After removal of glass and standard acid surface re-etch |
|---|---|---|---|
| $I_R^{200}$ | 150 | greater than 10,000 | 40 |
|  | 60 | about 10,000 | 40 |
|  | 45 | about 1,000 | 60 |
|  | 80 | 80 | 100 |
|  | 120 | 100 | 200 |
|  | 70 | about 1,000 | 50 |
| $I_R^{40}$ | 26 | 5 | 14 |
|  | 24 | 9 | 18 |
|  | 26 | 70 | 18 |
|  | 26 | 60 | 13 |
|  | 23 | 6 | 10 |
|  | 24 | 4 | 22 |

It will be appreciated that the invention is primarily directed to the removal of the glasses. Since the work here described is an outgrowth of a program directed to the development of a suitable encapsulant for semiconductor devices, much of the work recorded is in terms of such devices. As is well known, the reverse current of such a device is particularly sensitive to the presence of surface contaminants. As a consequence, this parameter is frequently used as a measure of the success or failure of a given encapsulation procedure. On this basis, a certain inconsistency appears on perusal of the data included on Table 3. Although certain of the devices included had obviously failed during packaging, certain others manifested reverse currents of the same order of magnitude as those recorded both before encapsulation and after glass removal. These devices were included solely to include a spread of glasseous compositions and two phase glass removing solutions. It is important to note that each of the devices so treated was examined under a microscope and found to be completely free of any glass residue. Some significance may be attached to the reverse currents recorded even for those devices which did not fail during encapsulation. That is, the fact that the reverse currents so recorded were still within the acceptable range indicated that no additional contaminants were introduced, and that the electrical characteristics were not deleteriously affected during glass removal.

The standard acid surface re-etch to which allusion is made above, and in accordance with which each of the devices tested was processed before the recorded measurements were made, was, in each instance, the standard surface etching and cleaning procedure utilized on the device prior to encapsulation. As is well known, the procedure is designed to remove damaged silicon such as dislocations introduced during previous processing, as in cutting, and also to remove surface contaminants, primarily ionic contaminants known to deleteriously affect the device characteristics. Many such procedures are known. The particular one used is dependent on the type of device and the type of material of which the device is made. Certain additional variations may be made at the option of the individual. Any such procedure found to be effective in removal of such imperfectons and impurities is suitably used in conjunction with the glass removing processes herein in the recovery and subsequent re-encapsulation of semiconductor devices.

The disclosure has, of necessity, been in terms of specific embodiments. Accordingly, it has been noted that various ratios of bromine to water, with or without any of a described class of diluents, also in varying amount, have been listed. It has been noted that these listed two-phase solutions have been used to advantage in the removal of various of the included glass compositions of the designated copending applications filed in the names of Flaschen and Pearson. Where the information was thought useful, etching rates have been noted. These etching rates, in the main, have reference to removal of glass from encapsulated devices having a total surface area of the order of 1 square centimeter.

The reported experiments and other experience gained from use of these materials may serve as the basis for certain generalizations. For etching to proceed in accordance with this invention, it is generally necessary only that there be sufficient bromine and sufficient water to result in a two-phase solution. The amount of material in each phase, for most expeditious use, is dependent on the size of the receptacle and the dimensions of the device from which the glass is to be removed. Since, as has been noted, attack on the glass proceeds primarily in the bromine-rich phase, and since, as also noted, the removal of the oxidized and/or dissolved products requires the presence of, and wetting by, the aqueous phase, it is desirable that each phase be of sufficient height to substantially encompass the device being treated. It has been observed that the useful life of a given two-phase solution is, in the main, dependent upon the amount of glasseous product dissolved in the aqueous phase. Accordingly, it has been found that a given two-phase solution may be rejuvenated merely by decanting and replacing the aqueous phase. It is apparent, therefore, that certain operations requiring the removal of substantial amounts of glass may dictate the use of a relatively high ratio of aqueous to bromine phase.

As observed above, the relative amounts of material in each of the two phases are not critical. Solutions listed have ranged from the general volume ratio of bromine to water of from approximately 2 to 1 to 2 to 9. Taking account of the gradual loss of bromine by solution in the aqueous phase, it is expected that the usual operation in which a relatively small amount of glass is to be removed will be carried out in two-phase solutions having a bromine to water ratio by volume of from about 1 to 10 to about 10 to 1.

The rate of glass removal for a fresh two-phase solution may be varied in two ways. As noted, the rate may be decreased by addition of a diluent which, although miscible with the bromine phase, is only slightly soluble in the aqueous phase. Various diluents have been set forth. Others are known to those skilled in the art. In the examples set forth, the amount of diluent relative to bromine has ranged from a volume ratio of about 1 to 1 to about 5 to 1. It is apparent that still slower etching rates may be achieved by use of higher ratios. Variation in etching rate may be achieved by operating at increased or decreased temperature. The effect of the former is to accelerate etching; that of the latter, to retard etching. Limitations on such temperature range are the boiling point of bromine at the high end (of the order of 58° C.) and the freezing point of water at the lower end, both as slightly affected by dissolution of material of the other phase.

Reported data has been restricted to removal of glasses of the arsenic-sulfur, arsenic-sulfur-thallium and arsenic-sulfur-iodine systems. Additional work has indicated the efficacy of the inventive process in the removal of glasses of the arsenic-sulfur-bromine system. The solutions described herein may be used to advantage on any such glass as described in the copending applications Serial Nos. 730,832 and 817,747, including such compositions to which the addition agents recited have been added. Other suitable glasseous compositions which may be dissolved as described herein include the arsenic-sulfur-selenium and arsenic-selenium-thallium glasses, also described in the copending applications.

The examples described have all been carried out on a laboratory scale. Modifications in receptacle shapes and other modes of operation to adapt the process to commercial use will be dictated by the particular operation of concern.

What is claimed is:
1. Method of removing a coating of a glass composition from a surface, said composition being included in at least one system selected from the group consisting of arsenic-sulfur, arsenic-sulfur-thallium, arsenic-sulfur-iodine, and arsenic-sulfur-bromine by use of a two-phase solution comprising an aqueous phase and a bromine-rich phase, comprising inserting the said coated surface in the said solution and contacting it in alternating fashion with each of the said phases until the glass has been removed.

2. Method in accordance with claim 1 in which the bromine-rich phase consists essentially of bromine.

3. Method in accordance with claim 1 in which the bromine-rich phase includes a solvent for bromine, which solvent is substantially immiscible with water.

4. Method in accordance with claim 3 in which the said solvent is carbon disulfide.

5. Method in accordance with claim 1 in which the said two-phase solution is maintained at an elevated temperature of up to about 58° centigrade.

6. Method in accordance with claim 1 in which the said two-phase solution is cooled to a temperature of down to about 0° centigrade.

7. Method in accordance with claim 1 in which the said coated surface is on a semiconductor device.

8. Method in accordance with claim 7 in which the said semiconductor device is a silicon diode.

References Cited in the file of this patent
UNITED STATES PATENTS

| | | |
|---|---|---|
| 2,435,889 | Kerridge | Feb. 10, 1948 |
| 2,482,547 | Kerridge | Sept. 20, 1949 |